United States Patent
Tang et al.

(10) Patent No.: US 8,631,860 B2
(45) Date of Patent: Jan. 21, 2014

(54) WATER-COOLED HEAT DISSIPATION SYSTEM AND WATER TANK THEREOF

(75) Inventors: Xian-Xiu Tang, Shenzhen (CN); Zhen-Xing Ye, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 1040 days.

(21) Appl. No.: 12/634,679

(22) Filed: Dec. 9, 2009

(65) Prior Publication Data
US 2011/0073286 A1 Mar. 31, 2011

(30) Foreign Application Priority Data

Sep. 29, 2009 (CN) .......................... 2009 1 0307968

(51) Int. Cl.
*F28D 15/00* (2006.01)
*H05K 7/20* (2006.01)

(52) U.S. Cl.
USPC ................. 165/278; 165/104.32; 165/104.33; 165/80.4; 165/80.5; 165/104.31; 123/41.51; 137/565.17; 137/587; 137/543.23

(58) Field of Classification Search
USPC ........ 165/104.32, 104.33, 80.4, 80.5, 104.21, 165/104.27, 278, 104.31; 123/41.51; 137/565.17, 587, 543.23; 361/704, 361/687, 699
See application file for complete search history.

(56) References Cited

U.S. PATENT DOCUMENTS

| | | | | | |
|---|---|---|---|---|---|
| 123,546 | A | * | 2/1872 | Ashton | 137/543.23 |
| 170,974 | A | * | 12/1875 | Westwater | 137/543.23 |
| 1,060,142 | A | * | 4/1913 | Stevens | 137/543.23 |
| 1,214,595 | A | * | 2/1917 | Sands | 137/543.23 |
| 3,390,541 | A | * | 7/1968 | Johnson et al. | 165/104.33 |
| 4,640,235 | A | * | 2/1987 | Martin | 123/41.03 |
| 5,731,954 | A | * | 3/1998 | Cheon | 361/699 |
| 7,124,775 | B2 | * | 10/2006 | Chang | 137/559 |
| 2002/0117291 | A1 | * | 8/2002 | Cheon | 165/80.4 |
| 2004/0008483 | A1 | * | 1/2004 | Cheon | 361/687 |

* cited by examiner

*Primary Examiner* — John Ford
(74) *Attorney, Agent, or Firm* — Altis Law Group, Inc.

(57) ABSTRACT

A water tank includes a box, an air valve body, a valve core, a cap, and an elastic element. The box defines an accommodating space and a vent communicating with the accommodating space. The air valve body is extended out from the box and adjacent to the vent. The valve core is mounted to the valve body to airproof the vent, and comprises a first end inserted into the accommodating space through the vent and a second end opposite to the first end. The elastic element is arranged between the cap and the valve core. The valve core will open the vent to deform the elastic member and allow heated air in the accommodating space to leak out of the accommodating space through the vent, in response to an air pressure in the box is greater a reference air pressure.

4 Claims, 4 Drawing Sheets

WATER-COOLED HEAT DISSIPATION SYSTEM AND WATER TANK THEREOF

BACKGROUND

1. Technical Field

The present disclosure relates to heat dissipation systems and, particularly, to a water-cooled heat dissipation system for dissipating heat of an electronic component using water.

2. Description of Related Art

An ordinary water-cooled heat dissipation system may include a water tank, a heat-dissipating fan, and a water-cooled heat sink. The water tank includes a water pump to transfer heated water to the heat-dissipating fan. The heat-dissipating fan cools the heated water, and then the cooled water is transferred into the water-cooled heat sink. The water-cooled heat sink is mounted on an electronic component to dissipate heat for the electronic component via the cooled water, and after heat exchange, the heated water is transferred to the water tank, and then the cycle repeats. Therefore, the water-cooled heat sink can continually dissipate heat for the electronic component.

However, when the heated water is transferred to the water tank, according to the theory of "expand with heat and contract with cold", the air in the water tank will expand, which may damage the case of the water tank or at least in seals thereof.

DETAILED DESCRIPTION

Figure 1:
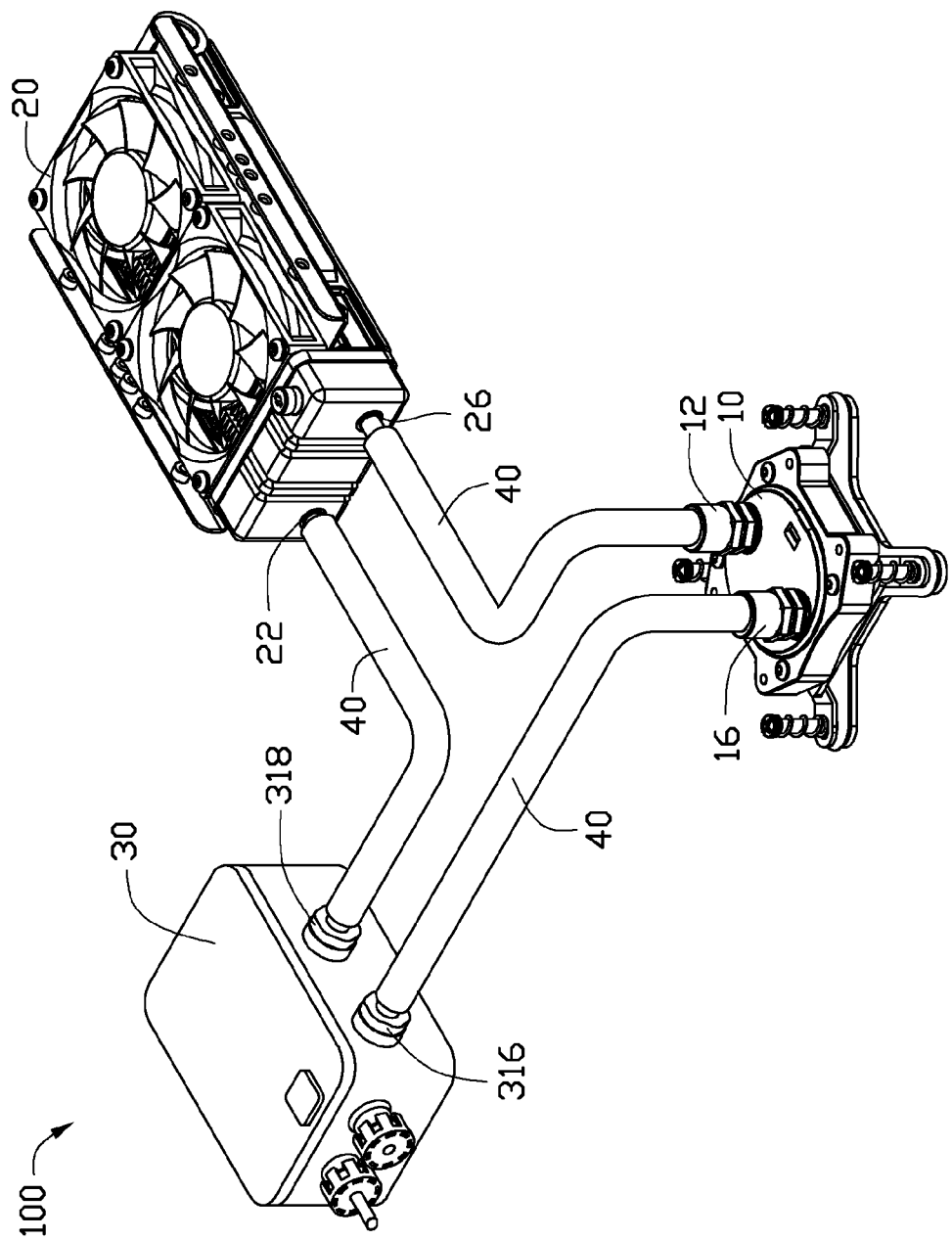
FIG. 1 is a schematic, isometric view of an exemplary embodiment of a water-cooled heat dissipation system including a water tank.

Referring to FIG. 1, an exemplary embodiment of a water-cooled heat dissipation system 100 is disclosed to dissipate heat for an electronic component (not shown), such as a central processing unit (CPU). The water-cooled heat dissipation system 100 includes a water-cooled heat sink 10, a heat-dissipating fan 20, a water tank 30, and a plurality of circulating pipes 40. The water-cooled heat sink 10, the heat-dissipating fan 20, and the water tank 30 are connected pairwise via the plurality of circulating pipes 40, to form a water circulation channel.

The water-cooled heat sink 10 may be mounted on the electronic component to dissipate heat for the electronic component. In use, cooled water is transferred into the water-cooled heat sink 10 through an inlet 12 to absorb heat from the electronic component, and after heat exchange, the heated water is transferred to the water tank 30, through an outlet 16, one of the plurality of circulating pipes 40, and an inlet 316 of the water tank 30. The water tank 30 transfers the heated water into the heat-dissipating fan 20 through an outlet 318, one of the plurality of circulating pipes 40, and an inlet 22. The heat-dissipating fan 20 cools the heated water, and then the cooled water is transferred into the water-cooled heat sink 10 through an outlet 26, one of the plurality of circulating pipes 40, and the inlet 12. Therefore, the water-cooled heat sink 10 can continually dissipate heat for the electronic component via cooled water. It may be understood that the water-cooled heat sink 10, the heat-dissipating fan 20, and the plurality of circulating pipes 40 fall within well-known technologies, and are therefore not described here.

Figure 2:
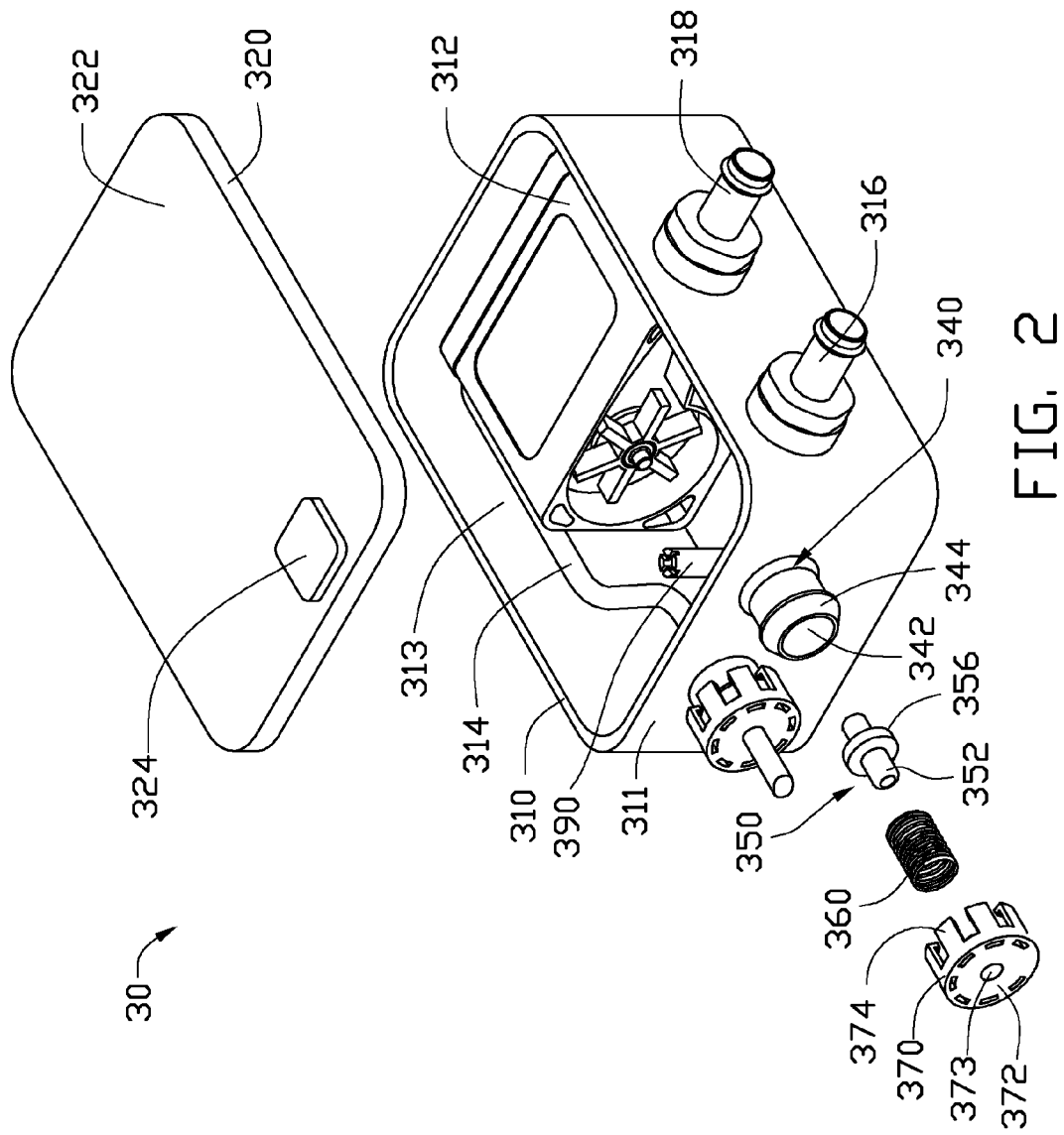
FIG. 2 is a partially exploded, isometric view of the water tank of the water-cooled heat dissipation system of FIG. 1.
Figure 3:
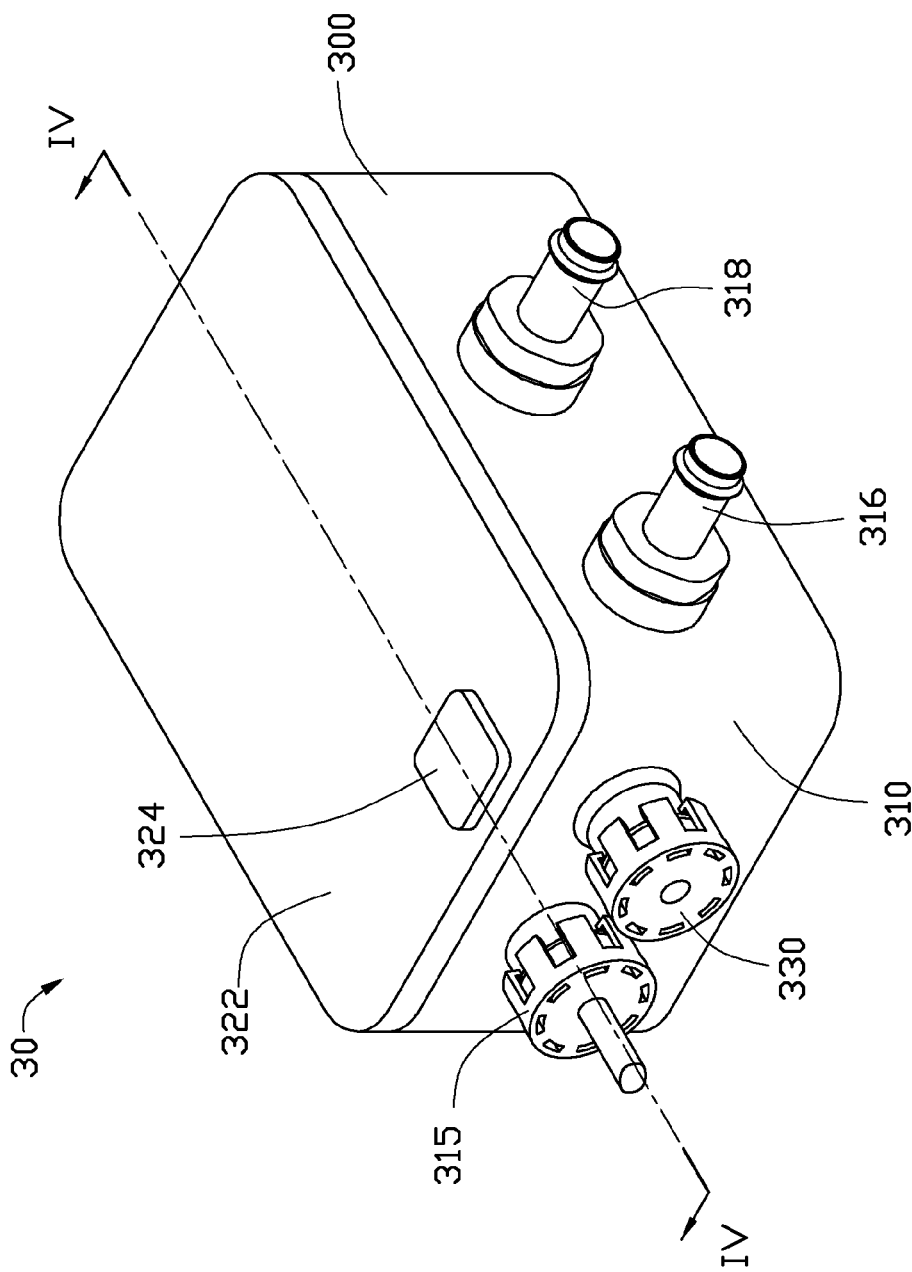
FIG. 3 is an assembled, isometric view of the water tank of FIG. 2.
Figure 4:
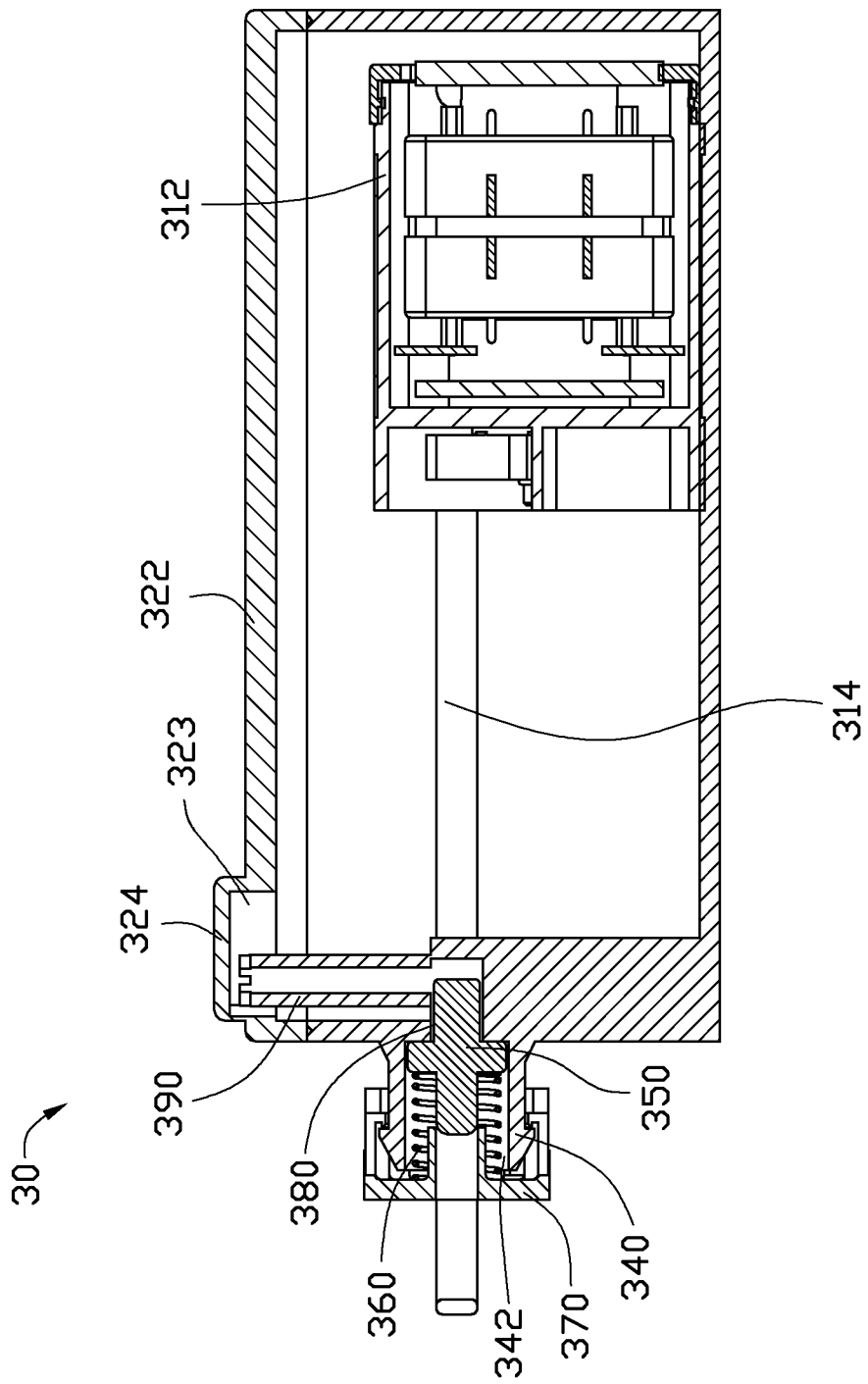
FIG. 4 is a cross-sectional view of the water tank of FIG. 3, take along the line IV-IV.

Referring to FIGS. 2 to 4, the water tank 30 includes a case 300, a water pump 312, an air pressure adjusting element 330, and an airtight element 315. The case 300 includes a box 310 defining an accommodating space 313 for accommodating water, and a cover 320. The inlet 316 and the outlet 318 are arranged on a sidewall of the box 310. The water pump 312 is arranged in the accommodating space 313 of the box 310 and communicated with the outlet 318, to provide drive power to transfer water from the box 310 to the heat-dissipating fan 20. A power cable 314 connected to the water pump 312 is extended out of a sidewall 311 of the box 310 and mounted to the sidewall 311 via the airtight element 315, to receive an external power signal to drive the water pump 312. The air pressure adjusting element 330 is arranged on the sidewall 311 of the box 310. The cover 320 includes a top wall 322. A hollow projecting portion 324 extends up from the top wall 322 of the cover 320, corresponding to the air pressure adjusting element 330, defining an inner space 323. When the cover 320 is covered on the box 310, the water tank 30 is airtight. It may be understood that the water pump 312 and the airtight element 315 fall within well-known technologies, and are therefore not described here.

A vent 380 is defined in the sidewall 311 of the box 310. The air pressure adjusting element 330 includes an air valve body 340 extended out from the side wall 311 of the box 310 and surrounding the vent 380, a valve core 350, an elastic element 360, a cap 370, and an air duct 390 connected between the vent 380 and the inner space 323 of the projecting portion 324. Because an inlet of the air duct 390 is located in the inner space 323 which is not filled with water, the water in the box 310 cannot flow into the air duct 390. The valve body 340 axially defines a receiving space 342 communicating with the vent 380. A flange 344 extends from a circumference of a distal end of the valve body 340, away from the box 310. The valve core 350 includes a column-shaped inserting portion 352 and a stuffing portion 356 extended from a circumference of a center of the inserting portion 352. A first end of the inserting portion 352 is passed through the vent 380 through the receiving space 342 of the valve body 340 to enter into an outlet of the air duct 390, with the stuffing portion 356 resisting the sidewall 311 of the box 310 to stuff the vent 380. A second end of the inserting portion 352 is passed through the elastic element 360, such as a coil spring. The cap 370 includes a round-shaped cap body 372 defining a through hole 373 in a center of the cap body 372, and a plurality of latches 374 extended from a side of the cap body 372, to engage with the flange 344 of the valve body 340. Therefore, the elastic element 360 is sandwiched between the stuffing portion 356 of the valve core 350 and the cap body 372 of the cap 370. The second end of the inserting portion 352 of the valve core 350 is resisted by the cap 370 at the position of the through hole 373 of the cap 370.

In one embodiment, the valve core 350 is made of plastic material. A diameter of the inserting portion 352 is equal to or less than a diameter of the vent 380. A diameter of the stuffing portion 356 is greater than the diameter of the vent 380. A diameter of the elastic element 360 is greater than the diameter of the inserting portion 352 and less than the diameter of the stuffing portion 356. A reference air pressure P1 exerted on the valve core 350 satisfies a formula: $P1=P0+K*H/S$, where, S is an effective area of the vent 380, H is an deformation quantity of the elastic element 360, K is an elastic coefficient of the elastic element 360, and P0 is an atmospheric pressure. In other embodiments, the reference air pressure P1 can be adjusted according to requirements by changing elasticity of the elastic element 360 or other reference parameters. If the air pressure adjusting element 330 is arranged on the top wall 322 of the cover 320, the air duct 390 can be omitted.

In use, when the heated water is transferred from the water-cooled heat sink 10 to the water tank 30, an air pressure P in the water tank 30 will be increased. When the air pressure P is less than or equal to the reference air pressure P1, the valve core 350 can airproof the vent 380. When the air pressure P is greater the reference air pressure P1, the air pressure P is applied on the valve core 350 to move the valve core 350 away from and open the vent 380, therefore air in the water tank 30 will be leaked through the vent 380 until the air pressure P is less than or equal to the reference air pressure P1. Therefore, the air pressure adjusting element 330 can prevent the water tank 30 from being damaged by the excessive air pressure.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A water-cooled heat dissipation system comprising:
    a water-cooled heat sink to absorb heat via cooled water, thereby heating the cooled water into heated water;
    a water tank defining an accommodating space to receive the heated water from the water-cooled heat sink, and a vent communicating with the accommodating space, the water tank comprising a water pump, and an air pressure adjusting element, wherein the air pressure adjusting element comprises:
    an air valve body extended out from the water tank, adjacent to the vent;
    a valve core mounted to the valve body and inserted into the accommodating space through the vent with a first end;
    a cap mounted to the air valve body, wherein a second end of the valve core opposite to the first end is exposed through the cap; and
    an elastic element connected between the cap and the valve core, to bias the valve core to airproof the vent, wherein the valve core will open the vent to deform the elastic member and allow air heated by the heated water in the water tank to leak out of the water tank through the vent, in response to an air pressure in the water tank being greater than a reference air pressure exerted on the exposed second end of the valve core; and
    a heat-dissipating fan to cool the heated water transferred via the water pump from the water tank into cooled water;
    wherein the water tank further comprises a box and a cover covered on the box, the air valve body extended outwardly from a sidewall of the box, the accommodating space is bounded by the box and the cover, a hollow projecting portion is extended from the cover and defines an inner space communicating with the accommodating space, the air pressure adjusting element further comprises an air duct connected between the vent and the inner space of the projecting portion, for receiving the first end of the valve core.

2. The water-cooled heat dissipation system of claim 1, wherein the elastic element is a coil spring fitting about the valve core.

3. The water-cooled heat dissipation system of claim 1, wherein the valve core comprises a column-shaped inserting portion and a stuffing portion extended from a circumference of a center of the inserting portion, a first end of the inserting portion functions as the first end of the valve core to pass through the vent, for making the stuffing portion resist an outer surface of the water tank to stuff the vent, and a second end of the inserting portion functions as the second end of the valve core to fit about the elastic element and expose through the vent.

4. The water-cooled heat dissipation system of claim 1, wherein the reference air pressure is equal to a sum of an atmospheric pressure and elasticity of the elastic element exerted on the valve core.

* * * * *